Oct. 5, 1937.   L. A. HYLAND   2,095,134
ELECTRICAL GENERATING AND CONTROL SYSTEM
Filed June 28, 1934
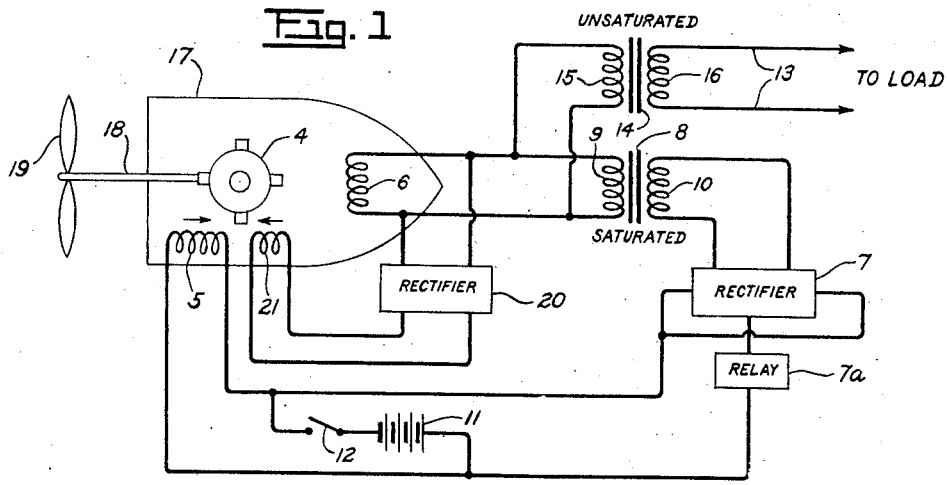
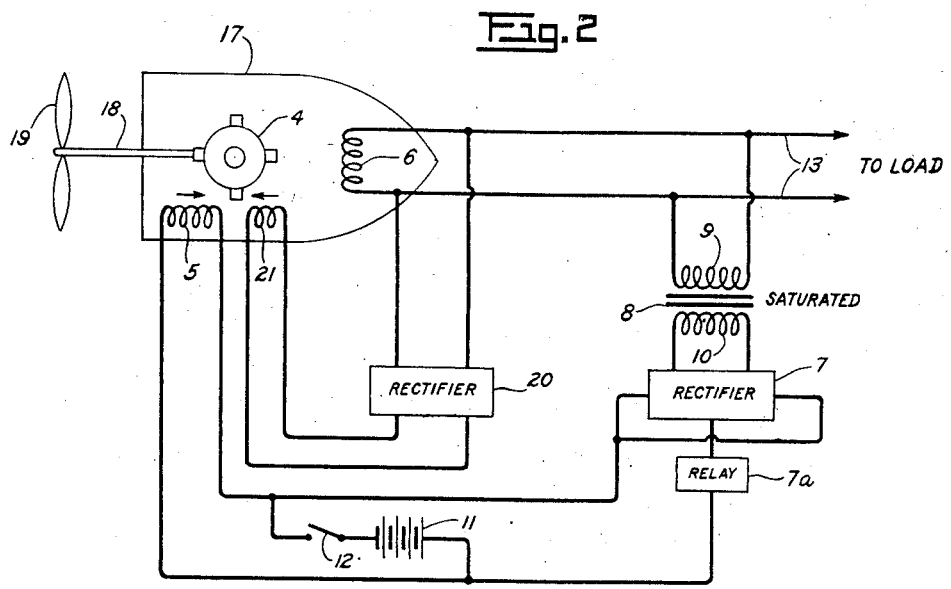
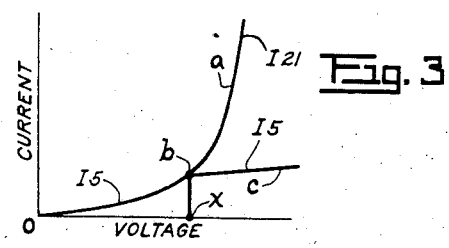
INVENTOR.
Lawrence A. Hyland
BY Harold Dodd
ATTORNEY.

Patented Oct. 5, 1937

2,095,134

UNITED STATES PATENT OFFICE 2,095,134

ELECTRICAL GENERATING AND CONTROL SYSTEM

Lawrence A. Hyland, Washington, D. C., assignor to Eclipse Aviation Corporation, East Orange, N. J., a corporation of New Jersey Application June 28, 1934, Serial No. 732,938

2 Claims. (Cl. 171—223)

The present application is a continuation in part of my application Serial No. 585,013 filed January 6, 1932, and relates to electrical generating systems and more particularly to the voltage control thereof.

The novel system embodying the invention disclosed herein is particularly adapted to be employed in places where it is in close proximity to radio receiving and transmitting apparatus as, for example, on aircraft where all equipment is necessarily crowded due to lack of space.

Among the difficulties experienced heretofore with generating systems of existing designs were the effects of electrical disturbances caused by transients produced by commutator sparking, voltage regulator contact sparking, and other similar electrical disturbances. Even in electrical power installations where alternating current is used for the receiver and transmitter of a radio signaling system, it has been the custom, heretofore, to employ a direct current generator in conjunction with an alternator to supply the field current for the latter, thereby producing electrical disturbances due to commutator sparking. Accordingly, one of the objects of the present invention is to provide a novel electrical generating and voltage control system wherein the foregoing difficulties are eliminated and by reason of which radio signaling is greatly improved.

Another object of the invention is to provide a novel electrical control system for regulating the output voltage of any alternating current generator.

Another object is to provide a novel electrical generating system whereby a generated potential is maintained substantially constant.

Another object of the invention is to provide a novel electrical generating and voltage control system wherein sliding contacts, such as commutators and collector rings, and make-and-break devices, such as contact voltage regulators, are eliminated and, hence, electrical disturbances in radio receiving systems are prevented.

Another object is to provide a novel generating and control system of the foregoing type including an inductor alternator and a source of electric current whereby auxiliary field excitation may be supplied to said alternator when the residual magnetism thereof is insufficient for self-excitation.

A further object is to provide in a generating system including a variable speed inductor alternator, a novel circuit arrangement whereby a portion of the output of said alternator is employed as field excitation current therefor to maintain the output voltage substantially constant.

A still further object is to provide in a system of the foregoing type, a novel circuit arrangement whereby a portion of the output current of said alternator is rectified and used to charge a battery, the latter being arranged to float on the output line of the alternator and to be employed as a source of auxiliary field excitation to start the generating system when the residual magnetism of the alternator is insufficient for the purpose.

A still further object is to provide in a system of the foregoing type a novel circuit arrangement whereby two portions of the output current of said alternator are separately rectified to provide a main field excitation and an auxiliary field excitation in opposition thereto and so arranged that the auxiliary field excitation increases relatively faster than the main field excitation for a given increase in the output voltage of the alternator whereby the resultant field excitation is reduced in response to an increase in the output voltage so that the latter is maintained substantially constant.

Still another object is to provide a novel generating and control system which is relatively simple in circuit hook-up, in arrangement and in number of parts, yet very efficient in operation and, therefore, particularly suitable for aircraft installations.

The above and other objects and advantages of the invention will appear more fully hereinafter from a consideration of the detailed description which follows, when taken together with the accompanying drawing wherein two embodiments of the invention are illustrated. It is to be expressly understood, however, that the drawing is for the purpose of illustration and description only and is not designed as a definition of the limits of the invention, reference being had for this purpose to the appended claims.

In the drawing, wherein like reference characters refer to like parts throughout the several views:

Fig. 1 is a schematic circuit diagram of one circuit arrangement embodying the present invention;

Fig. 2 is a schematic circuit diagram illustrating another embodiment of the invention; and Fig. 3 is a characteristic curve of a copper-oxide rectifier showing one effective portion which is utilized in the rectifier supplying current to the main field winding and another effective portion of the rectifier which is utilized in supplying current to the auxiliary opposed field winding.

In many instances where alternating current generators are employed it is necessary to control the generated potential within certain limits. This is especially true where the generated potential is employed to energize thermionic vacuum tubes of high frequency signaling systems. Ordinarily, the output voltage of the alternating current generator varies with the speed of the generator and it is possible to control the output of said generator by controlling the exciting energy in accordance with changes in the frequency or output voltage of said generator by associating with the output circuit of the generator a tuned circuit tuned to a frequency lower than the normal operating frequency of the generator. According to the present invention, however, there is provided a novel apparatus for controlling the output of an alternator to maintain the output voltage constant irrespective of speed, said apparatus consisting generally in an alternator provided with a main field winding and an auxiliary or differential field winding arranged in opposed relation to said main field winding. The opposed auxiliary field winding is preferably directly connected to the output circuit of the alternator through a rectifier of any suitable type, such as a thermionic vacuum tube type or a copper-oxide type, so that direct current passes through said auxiliary field winding to produce the necessary magnetic flux, while the main field winding is connected to the output circuit of the alternator through a second rectifier which is similar to the first one, and through a saturated transformer so that for a given increase in the output voltage of the alternator, the rectifier associated with the auxiliary field winding provides uni-directional current at a faster rate than the rectifier associated with the main field winding by reason of the fact that the voltage across the secondary of the saturated transformer to which the rectifier supplying current to the main field winding is connected will not materially increase for an increase in voltage impressed across the primary thereof beyond the saturation point of such transformer. An external source of potential, such as a battery, is also provided in parallel with the circuit of the main field winding for initially energizing the latter when the residual magnetism in the alternator rotor is insufficient to start the generation of the electric current. A switch is also provided for cutting off the external source after the alternator is in operation. A reverse current relay may be employed between the source and the rectifier associated with the main field winding to prevent the passage of current through said rectifier when the switch is closed.

Referring to the drawing, and more particularly to Fig. 1, the generator or armature shown is of the inductor type embodying a rotor 4 which rotates adjacent to the magnetic field produced by a main field winding 5, and an armature winding 6 which constitutes the output of the alternator. A portion of the output of armature winding 6 is by-passed and delivered to a rectifier 7 which is preferably of the copper-oxide type, although it may be of the thermionic vacuum type, the input of which is connected to the armature winding 6 through a transformer having a core 8 and primary and secondary windings 9 and 10, respectively, the primary being connected to the winding 6 and the secondary being connected to the rectifier 7. The output of the rectifier 7 is connected to the main field winding 5 through a reverse current relay 7a, thereby producing a magnetic field which is proportional to the value of the rectified current, the latter, however, being limited by the action of the transformer by reason of the fact that the core 8 of said transformer becomes saturated at a certain value of the output voltage so that for any increase of the output voltage beyond the predetermined value there is no material increase in voltage across the secondary 10, thus providing an energizing current to the main field winding 5 which increases very slowly for any increase in the output voltage beyond the saturation point of the core 8 of the transformer. As pointed out hereinbefore, it may be necessary to excite the winding 5 from an independent source, such as a battery 11, for starting the alternator, a switch 12 being provided to open the circuit to source 11 when the necessary current is supplied by the rectifier 7. The main output of the alternator constitutes a supply circuit 13 which is connected to the armature winding 6 through a second transformer having a core 14 and primary winding and secondary windings 15 and 16, respectively. The core 14, however, is unsaturated. The supply circuit 13 may deliver power to the usual devices aboard an aircraft as, for example, to lights, heaters, or to a radio generator. The alternator is shown as of the type designed for aeronautical installation having a stream-lined shell or cover 17 and the rotor 4 thereof is adapted to be driven by a propeller shaft 18 from a wind driven propeller 19. The transformer windings 9 and 10, the rectifier 7, the reverse current relay 7a, and the main field winding 5 form one part of the voltage control system.

Means are now provided which constitute the other part of the system for controlling the output voltage of the alternator and, in the form shown, said means comprise a second rectifier 20 which is also preferably of the copper-oxide type, although it may be of the thermionic vacuum tube type, the input of which is directly connected across the armature winding 6. The output of the rectifier 20 supplies excitation current to an auxiliary field winding 21 which is wound in opposed relation to the main field winding 5 and has fewer turns than the main field winding so that normally the magnetic field produced by the main field winding predominates. The rectifier 20 is substantially like the rectifier 7 and, therefore, the characteristics are substantially alike. Since, however, the rectifier 20 is connected directly to the armature winding 6, an increase in the output voltage beyond the predetermined value at which the core 8 becomes saturated will produce a corresponding increase in current in the output of the rectifier 20 and, hence, the field produced by the auxiliary winding 21 will be increased accordingly. This phenomenon will be more readily apparent from the curve shown in Fig. 3 of the drawing in which the characteristic curve of both rectifiers is shown at $a$. The saturation point of the core 8 is shown on the curve at $b$ which occurs at a predetermined voltage $x$ so that the rectifier 7 operates on the lower portion of the curve from 0 to $b$ while the rectifier 20 operates on the lower portion of the curve and also on the upper portion of the curve from $b$ upward. Thus, it will be seen that the current in the main field winding increases as a function of the lower portion of the curve up to the point $b$ and from the point $b$, i. e., as the voltage increases beyond $x$, the current increases relatively slowly as shown by the line $c$ in Fig. 3, while the current in the auxiliary winding 21 above a certain voltage increases as a function of the upper portion of the curve, i. e., from the point $b$ upward. From these characteristics it will be seen that for a given increase in the output voltage of the alternator due to increased speed, the field current supplied by rectifier 20 increases at a faster rate than the current supplied by the rectifier 7. Thus, as the output voltage of the alternator rises the main field is increased relatively slowly as compared to the auxiliary field which increases more rapidly. Consequently, since the auxiliary field winding 21 is in opposition to the main field winding 5, as represented by the arrows, the resultant magnetic field of the two windings will decrease as the output voltage increases due to increased speed of the alternator.

It will now be apparent that when the inductor 4 of the alternator is rotated by means of the propeller 19, and a certain amount of residual magnetism remains in the pole pieces of the main field 5, then as the inductor cuts through the lines of force produced by such magnetism a current will be generated in the armature 6. A portion of the current from the armature 6 is rectified by the rectifier 7 and is then passed to the main field winding 5, thus causing a more intense magnetic flux to be built up in the field system, and the alternator thereby assumes its normal potential. At the same time, however, a certain amount of current is rectified in the rectifier 20 and passed through the auxiliary field winding 21, creating a magnetic flux therein which opposes the flux built up by the field winding 5. For a normal value of the output voltage of the alternator, the excitation currents in the windings 5 and 21 are such that the main field provided by the winding 5 predominates, but upon an increase in voltage above normal, the excitation current in winding 21 increases at a faster rate than in winding 5 due to the operation of the rectifiers 20 and 7, respectively, which operate on different portions of their characteristic curves, as shown in Fig. 3, by virtue of the action of the saturated core 8 and transformer windings 9 and 10 in accordance with the invention. Consequently, a constant output voltage is maintained since it will be apparent that the resultant field flux will decrease if the output voltage of the alternator increases above the normal value at which the core 8 becomes saturated.

In the event that the residual magnetism of the alternator is insufficient to cause current to be generated in the armature 6 by the starting of the system, the switch 12 is used, thereby permitting current to flow through the main field winding 5 from the battery 11. The alternator current then builds up as before and switch 12 is opened, the system thereafter operating as a unit without the necessity of battery 11 being in the circuit.

Referring to Fig. 2, the alternator is the same as that shown in Fig. 1 and is provided with main and auxiliary field windings and an armature winding, as before, the main difference being that the armature winding 6 is directly connected to the supply circuit 13 instead of being connected thereto through an unsaturated transformer in the manner shown in Fig. 1. Except for this change the system operates in the same manner as that shown in Fig. 1.

There is thus provided a novel generating and control system in which the output voltage is maintained substantially constant and in which no circuit interrupting devices are employed during the operating of the system so that no electrical disturbances are produced which would affect a radio signaling system employed in the vicinity thereof.

Although only two embodiments of the invention have been illustrated and described, other changes and modifications in circuit arrangement and selection of parts, which will now appear to those skilled in the art, may be made without departing from the scope of the invention. An alternating current generator differing from the type shown may be employed such as, for example, of the stationary armature and rotating field type, or one having a rotating armature and a stationary field. Reference will, therefore, be had to the appended claims for a definition of the limits of the invention.

What is claimed is:

1. In combination with a source of electromotive force which comprises an alternator having an output winding, a main field winding and a differential field winding, a saturated transformer including primary and secondary windings and having its primary winding connected to said output winding, a rectifier having its input connected to the secondary of said transformer and its output connected to said main field winding for supplying direct current to the latter in proportion to the output voltage up to the saturation point of said transformer, and a second rectifier associated with the output winding and the differential field winding for supplying direct current of such value to said differential winding that the combined strength of the two field windings is reduced in response to an increase in voltage in the output winding.

2. In combination with a source of electromotive force which comprises an alternator having an output winding, a main field winding and a differential field winding, a transformer having primary and secondary windings and adapted to be saturated above a predetermined voltage in the output winding, the primary of said transformer being connected to said output winding, a rectifier having its input connected to the secondary of said transformer and its output connected to the main field winding, a battery connected between said rectifier and the main field winding and across the latter, a reverse current relay associated with said rectifier and said main field winding for controlling the current to the battery and to said main field winding, a switch for energizing the main field winding from the battery, and a second rectifier associated with the output winding and the differential field winding for supplying direct current of such value to said differential field winding that the combined strength of the two field windings is reduced in response to an increase in voltage in the output winding.

LAWRENCE A. HYLAND.